(12) United States Patent
Polaganga et al.

(10) Patent No.: US 12,256,448 B2
(45) Date of Patent: *Mar. 18, 2025

(54) TRIGGER BASED CONFIGURATION OF WIRELESS PROTOCOLS IN COMMUNICATION NETWORKS

(71) Applicant: T-MOBILE INNOVATIONS LLC, Overland Park, KS (US)

(72) Inventors: Roopesh Kumar Polaganga, Bothell, WA (US); Deepak Nadh Tammana, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,650

(22) Filed: Dec. 29, 2023

(65) Prior Publication Data
US 2024/0138005 A1    Apr. 25, 2024

Related U.S. Application Data

(63) Continuation of application No. 17/409,247, filed on Aug. 23, 2021, now Pat. No. 11,895,719.

(51) Int. Cl.
*H04W 76/15* (2018.01)
*H04W 24/02* (2009.01)
*H04W 36/30* (2009.01)

(52) U.S. Cl.
CPC .......... *H04W 76/15* (2018.02); *H04W 24/02* (2013.01); *H04W 36/302* (2023.05)

(58) Field of Classification Search
CPC .............................. H04W 24/02; H04W 76/15
See application file for complete search history.

(56) References Cited

U.S. PATENT DOCUMENTS 5,649,000 A    7/1997    Lee et al.
7,551,586 B1   6/2009    Yew et al.
(Continued)

FOREIGN PATENT DOCUMENTS

WO    2017/019243 A1    2/2017

OTHER PUBLICATIONS

D. Karunkuzhali and D. C. Tomar, "Traffic based Duo-triggered handoff algorithm for enhanced buffer management and QoS in Wimax 16m networks," 2013 International Conference on Pattern Recognition, Informatics and Mobile Engineering, Salem, India, 2013, pp. 333-339, doi: 10.1109/ICPRIME.2013.6496496 (Year: 2013).*

(Continued)

*Primary Examiner* — William D Cumming
(74) *Attorney, Agent, or Firm* — SHOOK, HARDY & BACON L.L.P.

(57) ABSTRACT

Systems, methods, and computer-readable media herein modify the utilized communication protocol of one or more wireless base stations and/or UE devices based on signal quality information or data rate information associated with one or more UE devices. The signal quality information or data rate information of the UE devices can be analyzed by a base station and the base station can respond to changes in signal quality or data rate of the UE devices by modifying the configuration of one or more base stations and/or UE devices from a first communication protocol to a second communication protocol quality of transmissions between the UE devices and a base station.

20 Claims, 8 Drawing Sheets

(56) References Cited

U.S. PATENT DOCUMENTS

| | | |
|---|---|---|
| 7,738,427 B1 | 6/2010 | Yew et al. |
| 8,385,216 B1 | 2/2013 | Shetty et al. |
| 9,148,836 B2 | 9/2015 | Shetty et al. |
| 9,860,084 B2 | 1/2018 | Houghton et al. |
| 9,912,468 B1 | 3/2018 | Ribo et al. |
| 10,498,613 B2 | 12/2019 | Zhao et al. |
| 10,721,661 B2 | 7/2020 | Jorgovanovic et al. |
| 10,779,173 B2 | 9/2020 | Pefkianakis |
| 11,895,719 B1 * | 2/2024 | Polaganga ............ H04W 76/15 |
| 2002/0009051 A1 | 1/2002 | Cloonan |
| 2013/0136106 A1 | 5/2013 | Shetty et al. |
| 2015/0149627 A1 | 5/2015 | Zhao et al. |
| 2016/0003035 A1 | 1/2016 | Logan et al. |
| 2017/0033950 A1 | 2/2017 | Houghton et al. |
| 2018/0054295 A1 | 2/2018 | Ribo et al. |
| 2019/0239104 A1 | 8/2019 | Pefkianakis |
| 2022/0015137 A1 | 1/2022 | Wu |
| 2024/0138005 A1 * | 4/2024 | Polaganga ............ H04W 24/02 |

OTHER PUBLICATIONS

R. A. R. Oliveira and A. A. Loureiro, "Improving user experience and resource management in wireless communications," NOMS 2008-2008 IEEE Network Operations and Management Symposium, Salvador, Brazil, 2008, pp. 971-974, doi: 10.1109/NOMS.2008.4575260. (Year: 2008).

* cited by examiner

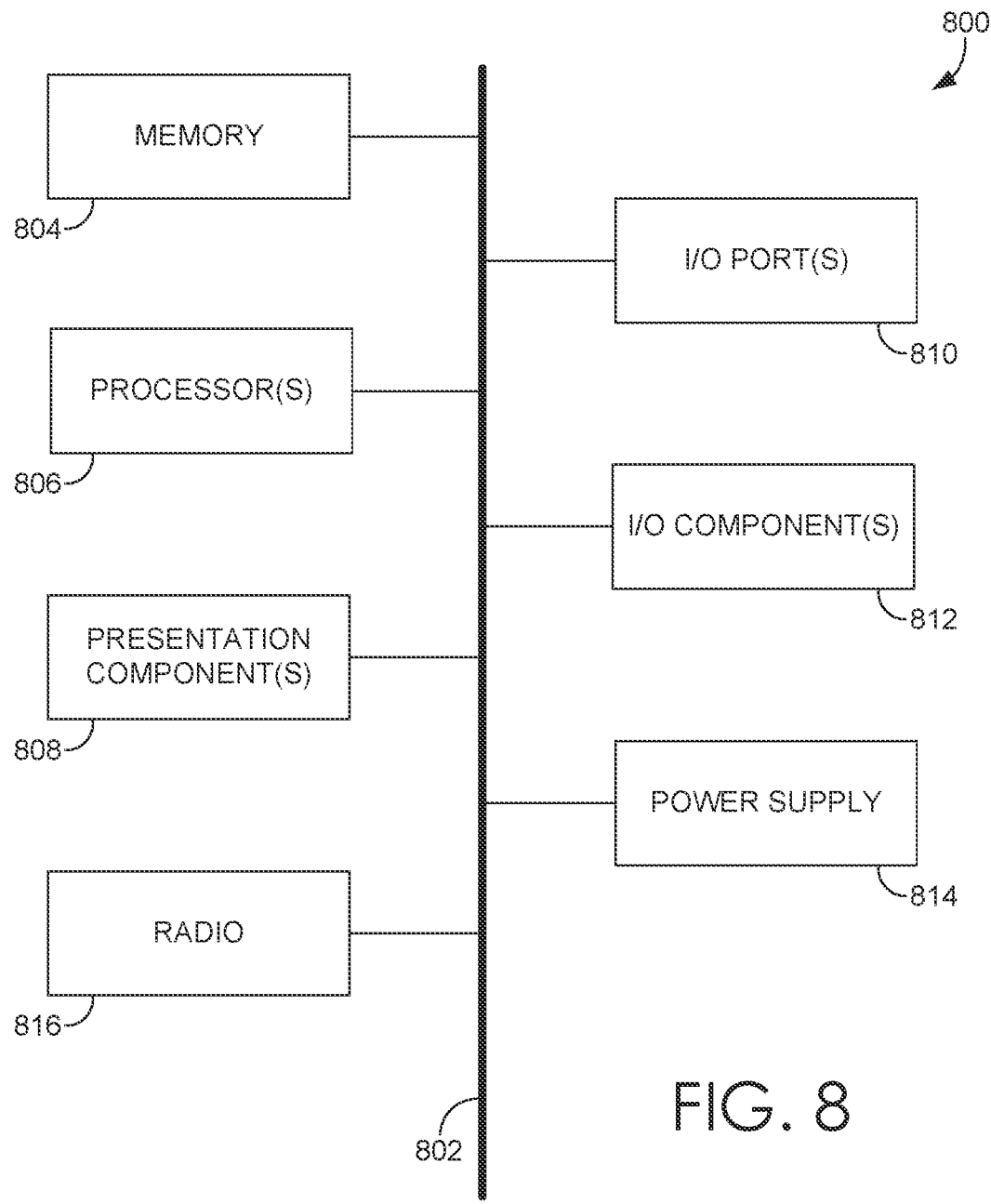

TRIGGER BASED CONFIGURATION OF WIRELESS PROTOCOLS IN COMMUNICATION NETWORKS

CROSS-REFERENCE TO RELATED APPLICATIONS

This application is a continuation of U.S. application Ser. No. 17/409,247, filed Aug. 23, 2021, and entitled "TRIGGER BASED CONFIGURATION OF WIRELESS PROTOCOLS IN COMMUNICATION NETWORKS," the entirety of which is incorporated herein by reference.

SUMMARY

The present disclosure is directed, in part, to trigger based configurations of wireless protocols in communication networks, substantially as shown in and/or described in connection with at least one of the figures, and as set forth more completely in the claims In aspects set forth herein, a wireless protocol may be activated in association with one or more devices, based at least partly on information associated with a device, such as signal quality information or a data rate value.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein:

FIG. 8 depicts a diagram of an exemplary computing environment suitable for use in implementations of the present disclosure.

DETAILED DESCRIPTION

Figure 1:
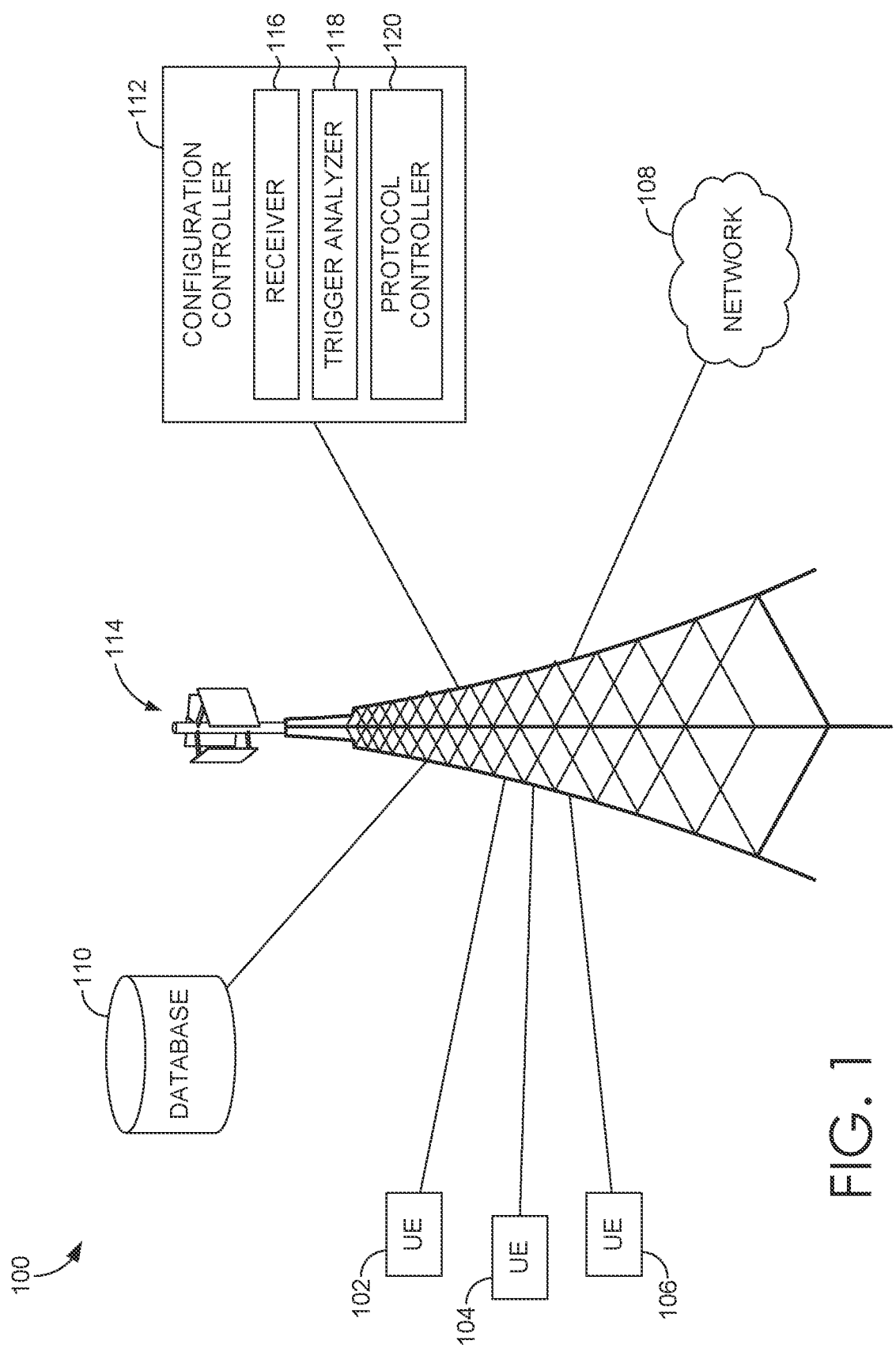
FIG. 1 illustrates a diagram of an exemplary network environment in which implementations of the present disclosure may be employed.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

AWS Advanced Wireless Services
BRS Broadband Radio Service
BTS Base Transceiver Station
CDMA Code Division Multiple Access
CSI-RS Channel State Information Reference Signal
EBS Educational Broadband Services
eNDC Evolved-Universal Terrestrial Radio Access New Radio Dual Connectivity
eNodeB Evolved Node B
EVDO Evolution-Data Optimized
gNodeB Next Generation Node B
GPS Global Positioning System
GSM Global System for Mobile Communications
HRPD High Rate Packet Data
eHRPD Enhanced High Rate Packet Data
LTE Long Term Evolution
LTE-A Long Term Evolution Advanced
NR 5G New Radio
PCS Broadband Personal Communications Service
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
WCS Wireless Communications Service
WiMAX Worldwide Interoperability for Microwave Access Further, various technical terms are used throughout this description. A definition of such terms can be found in, for example, Newton's Telecom Dictionary by H. Newton, 31st Edition (2018). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of the technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media includes volatile and/or non-volatile media, removable and non-removable media, and contemplate media readable by a database, a switch, and various other network devices. Network switches, routers, and related components are conventional in nature, as are means of communicating with the same. By way of example and not limitation, computer-readable media comprise computer storage media and/or communications media.

Computer storage media, or machine-readable media, include media implemented in any method or technology for storing information. Examples of stored information include computer-useable instructions, data structures, program modules, and other data representations. Computer storage media include RAM, ROM, EEPROM, flash memory or other memory technology, CD-ROM, digital versatile discs (DVDs), holographic media or other optical disc storage, magnetic cassettes, magnetic tape, magnetic disc storage, and/or other magnetic storage devices. These memory components can store data momentarily, temporarily, or permanently. Computer storage media does not encompass a transitory signal, in embodiments of the present invention.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, conventional telecommunications networks may employ base stations (e.g., cell sites, cell towers) to provide network coverage. These base stations may be utilized to broadcast to, and receive transmissions from, user devices of the telecommunications network. Conventionally, base stations can transmit and receive signals according to one or more communication protocols. For example a base station may be operated based on a LTE protocol or may be operated based on a NR or 5G protocol. Often, a base station will be equipped to operate on multiple protocols, either interchangeably or simultaneously. For example, in some circumstances, a base station may be configured to transmit and receive data from a device using a dual connectivity protocol. A dual connectivity protocol, such as eNDC, may enable a device and one or more base stations to operate on a LTE core network while utilizing one or more cells associated with NR or 5G. Using the additional cells associated with NR or 5G allows for an improved data rate and spectrum coverage. The base station may be instructed to operate using a dual connectivity protocol in response to a multitude of factors, such as communication network traffic, the quantity and type of devices associated with the communication network, and/or signal quality information associated with one or more devices. The protocol used to facilitate communication between a base station and a device may be activated and/or deactivated based on changing characteristics or conditions of the communication network. For example, a base station may elect to operate based on only a LTE protocol, when it is more efficient to do so. A network provider may prefer that base stations operate using a particular protocol over another protocol. As such, there exists an issue in attempts to re-establish a configuration between a base station and a device to the preferred protocol. Conventionally, base stations may attempt to establish a connection using a preferred protocol based on performing periodic measurements. The measurements may be performed after a determined timeout period or may performed at a chosen frequency. Performing these measurements requires network bandwidth and computational resources of the corresponding device. As such, resources of the communication network are consumed and may present a diminished experience to the end user (e.g., users of the device) such as increased communication latency and decreased data or information throughput.

At a high level, systems, methods, and computer-readable media of the present invention modify the configuration of a base station and/or UE device based on information associated with one or more UE devices. The systems, methods, and computer readable media disclosed herein may provide an improved efficiency, quality, power consumption, and/or bandwidth of transmissions associated with a base station and/or UE device. By basing the configuration of the base station and/or UE device on information associated with the UE devices, such as signal quality or data rate, the base station and/or UE device can be configured to engage and/or disengage a communication protocol as needed to provide appropriate service to a UE device. Adapting the configuration of the base station enables an improved user experience for the users of the UE device as data throughput and latency are enhanced.

In a first aspect of the present invention, a method is provided. The method comprises receiving information associated with a device operating on a first wireless protocol. The information may comprise a data rate value and/or a signal quality value for the device. The method further comprises determining, based on the information associated with the device, that the data rate exceeds a data rate threshold or that the signal quality value exceeds a signal quality threshold. The method further comprises, causing activation of a second wireless protocol based on determining that the data rate value exceed the data rate threshold or that the signal quality value exceeds the signal quality threshold.

In a second aspect of the present invention, computer-readable media is provided, the computer-readable media having compute-executable instructions embodied thereon that, when executed, perform a method. In accordance with the media, information associated with a device operating on a first wireless protocol is received. In some embodiments, the information associated with the device may comprise a data rate value and a signal quality value for the device. The method further comprises, determining that the data rate value exceeds a data rate threshold or determining that the signal quality value exceeds a signal quality threshold. In some embodiments, this determination may be made based on the information associated with the device. The method further comprises, causing activation of a second wireless protocol for the device. In some embodiments, causing activation of the second wireless protocol for the device, may be based on determining that the data rate value exceeds the data rate threshold or that the signal quality value exceeds the signal quality threshold.

In a third aspect of the present invention, a system is provided. The system comprises an antenna array comprising a plurality of antenna elements. In some embodiments, the plurality of antenna elements are configured according to a first wireless protocol at a first time. The system also comprises a processor configured to execute operations comprising, receiving information associated with a device operating on the first wireless protocol, the information comprising a data rate value and a signal quality value for the device. The operations also may comprise, determining, based on the information associated with the device, that the data rate value exceeds a data rate threshold or that the signal quality value exceeds a signal quality threshold. The operations may further comprise, causing activation, at a second time, based on determining that the data rate value exceeds the data rate threshold or that the signal quality value exceeds the signal quality threshold, of a second wireless protocol for the plurality of antenna elements.

As used herein, user equipment (UE) (also referenced herein as a user device or UE device) can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 800 described herein with respect to FIG. 8.

Turning now to FIG. 1, network environment 100 is an exemplary network environment in which implementations of the present disclosure may be employed. Network environment 100 is one example of a suitable network environment and is not intended to suggest any limitation as to the scope of use or functionality of the present disclosure. Neither should the network environment be interpreted as having any dependency or requirement relating to any one or combination of components illustrated.

The network environment 100 of FIG. 1 includes user devices 102, 104, and 106, a cell site 114, a network 108, a database 110, and a configuration controller 112. In the network environment 100, the user devices 102, 104, and 106 may take on a variety of forms, such as a PC, a user device, a smart phone, a smart watch, a laptop computer, a mobile phone, a mobile device, a tablet computer, a wearable computer, a PDA, a server, a CD player, an MP3 player, GPS device, a video player, a handheld communications device, a workstation, a router, an access point, and any combination of these delineated devices, or any other device that communicates via wireless communications with a cell site 114 in order to interact with network 108, which may be a public or a private network.

In some aspects, the user devices 102, 104, and 106 corresponds to a user device or a computing device. For example, the user device may include a display(s), a power source(s) (e.g., a battery), a data store(s), a speaker(s), memory, a buffer(s), a radio(s), and the like. In some implementations, the user devices 102, 104, and 106 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, LTE, CDMA, or any other type of network.

In some cases, the user devices 102, 104, and 106 in network environment 100 may optionally utilize network 108 to communicate with other computing devices (e.g., a mobile device(s), a server(s), a personal computer(s), etc.) through cell site 114. The network 108 may be a telecommunications network(s), or a portion thereof. A telecommunications network might include an array of devices or components (e.g., one or more base stations), some of which are not shown. Those devices or components may form network environments similar to what is shown in FIG. 1 and may also perform methods in accordance with the present disclosure. Components such as terminals, links, and nodes (as well as other components) may provide connectivity in various implementations. Network 108 may include multiple networks, as well as being a network of networks, but is shown in more simple form so as to not obscure other aspects of the present disclosure.

Network 108 may be part of a telecommunication network that connects subscribers to their service provider. In aspects, the service provider may be a telecommunications service provider, an internet service provider, or any other similar service provider that provides at least one of voice telecommunications and/or data services to user devices 102, 104, and 106 and any other UEs. For example, network 108 may be associated with a telecommunications provider that provides services (e.g., LTE) to the user devices 102, 104, and 106. Additionally or alternatively, network 108 may provide voice, SMS, and/or data services to user devices or corresponding users that are registered or subscribed to utilize the services provided by a telecommunications provider. Network 108 may comprise any communication network providing voice, SMS, and/or data service(s), using any one or more wireless communication protocols, such as a 1× circuit voice, a 3G network (e.g., CDMA, CDMA2000, WCDMA, GSM, UMTS), a 4G network (WiMAX, LTE, HSDPA), or a 5G (NR) network. The network 108 may also be, in whole or in part, or have characteristics of, a self-optimizing network.

In some implementations, cell site 114 is configured to communicate with the user devices 102, 104, and 106 that are located within the geographical area defined by a transmission range and/or receiving range of the radio antennas of cell site 114. The geographical area may be referred to as the "coverage area" or "coverage footprint" of the cell site or simply the "cell," as used interchangeably hereinafter. Cell site 114 may include one or more base stations, base transmitter stations, radios, antennas, antenna arrays, power amplifiers, transmitters/receivers, digital signal processors, control electronics, GPS equipment, and the like. In particular, cell site 114 may be configured to wirelessly communicate with devices within a defined and limited geographical area. For the purposes of the present disclosure, it may be assumed that it is undesirable and unintended by the network 108 that the cell site 114 provide wireless connectivity to the user devices 102, 104, and 106 when the user devices 102, 104, and 106 are geographically situated outside of the cell associated with the cell site 114.

In an exemplary aspect, the cell site 114 comprises a base station that serves at least one sector of the cell associated with the cell site 114 and at least one transmit antenna for propagating a signal from the base station to one or more of the user devices 102, 104, and 106. In other aspects, the cell site 114 may comprise multiple base stations and/or multiple transmit antennas for each of the one or more base stations, any one or more of which may serve at least a portion of the cell. In some aspects, the cell site 114 may comprise one or more macro cells (providing wireless coverage for users within a large geographic area) or it may be a small cell (providing wireless coverage for users within a small geographic area). For example, macro cells may correspond to a coverage area having a radius of approximately 1-15 miles or more as measured at ground level and extending outward from an antenna at the cell site. In another example, a small cell may correspond to a coverage area having a radius of approximately less than three miles as measured at ground level and extending outward from an antenna at the cell site.

As shown, cell site 114 is in communication with the configuration controller 112, which comprises various components that are utilized, in various implementations, to perform one or more methods for configuring one or more base stations and/or user devices to operate using a particular protocol, such as a base station included in the cell site 114. In aspects, the configuration controller 112 may comprise a receiver 116, an trigger analyzer 118, and a protocol controller 120. However, in some embodiments, other components than those shown in FIG. 1 may be utilized to carry out aspects of the systems and methods described herein. Each of the components or sub components of the configuration controller 112 may be a stand-alone or combined processor, server, or other computer processing component that is suitably configured to perform the operations described herein.

In various aspects, the receiver 116 of the beamforming controller 112 is generally responsible for receiving information associated with one or more user devices, e.g., the user devices 102, 104, and/or 106. In aspects, the receiver 116 may receive a message or transmission comprising the information associated with one or more user devices may be information that is relevant for configuring one or more base stations and/or user devices for communication with one or more devices. For instance, in certain aspects, the information associated with one or more user devices may be associated with a reference signal used to control and manage downlink channels. In some embodiments, a reference signal such as a synchronization signal block ("SSB") may be transmitted by the base station to downlink receivers, such as user devices 102, 104, and 106. In response to receiving a reference signal, a device can use downlink reference signals to aid in synchronization and measuring signal quality. The device can generate an uplink reference signal that may include a measurement report indicating various measurements of the device such as one or more signal quality measurements. As an example, references signals may be used to estimate communication signal power, tracking transmitter phase, channel sounding, or any of a number of communication operations. In some aspects, a reference signal may comprise DMRS, PT-RS, CSI-RS, SRS, or a combination thereof. In certain aspects, the information associated with one or more user devices can include signal quality information associated with one or more user devices. Signal quality information may comprise any value, measure, or indication of signal attributes (e.g., power, noise, quality, signal strength). Signal quality information may comprise measurements such as SINR, RSRP, RSRQ, RSSI, or a combination thereof.

In aspects, the trigger analyzer 118 utilizes and/or analyzes the information received by the receiver 116 to identify whether a protocol such as a dual connectivity protocol should be established and/or re-established. For example, the trigger analyzer 118 may identify that one or more base stations should switch from a LTE protocol to a 5G dual connectivity protocol for a particular device based on information received from the device by the receiver 116. In aspects, the trigger analyzer 118 can analyze signal quality information associated with one or more devices, to identify conditions that may provoke modification of the base station configuration from a first protocol to a second protocol. For instance, in aspects, the trigger analyzer 118 can analyze the information associated with the one or more user devices to facilitate effective use of the base station equipment and data capacity by the user devices. Specific use examples of the configuration controller 112 and/or the trigger analyzer 118 utilizing the information associated with the one or more user devices to identify conditions for modification of a base station protocol are discussed below with reference to FIG. 3.

The trigger analyzer 118 may identify conditions that may trigger the modification of a base station and/or user device protocol such as conditions associated with user device measurements, levels of service, and/or user device attributes or capabilities. In some embodiments, the trigger analyzer 118 may have pre-determined trigger conditions, while in other examples the trigger analyzer 118 may rely on calculating trigger conditions that are periodically updated. As an example, a pre-determined RSRP measurement of −44 dbm may act as a trigger condition, or alternatively the RSRP measurement required to satisfy a trigger condition may be based on calculating an average of previous RSRP measurements, comparing previously stored RSRP measurements, various service levels available to the device, and/or any other condition or criterion.

In further embodiments, the trigger analyzer 118 may identify a trigger condition based on a data rate trigger associated with a user device. For example, the trigger analyzer 118 may determine that the quantity of data requested by the user device exceeds a threshold. In some examples, the size of a data buffer may be used to identify a trigger condition. For example, the trigger analyzer 118 may determine that the length of a data buffer associated with a user device exceeds a pre-determined threshold and therefore may trigger the modification of a base station protocol to accommodate the increased data demand of the user device. While using the size or length of a data buffer is contemplated herein, it is not intended to be limiting, and any of a number of methods of evaluating the data demands of a user device may be implemented, for example, a trigger condition that is satisfied when a certain percentage of data buffer capacity is in use.

In aspects, once the trigger analyzer 118 has identified one or more trigger conditions for modifying a base station and/or user device configuration from a first protocol to a second protocol, the protocol controller 120 facilitates the modification of the configuration of the base station and/or user device for an intended protocol. In one example aspect, the protocol controller 120 can control or instruct the base station to change operation from one particular mode to another mode. For example the protocol controller 120 may instruct a base station which is operating on a LTE protocol in relation to a user device, to begin procedures to establish a NR or eNDC configuration with the user device. In some embodiments, a second protocol may be activated, while is some embodiments, only some procedures or actions attempting to establish a second protocol may be activated.

Figure 2:
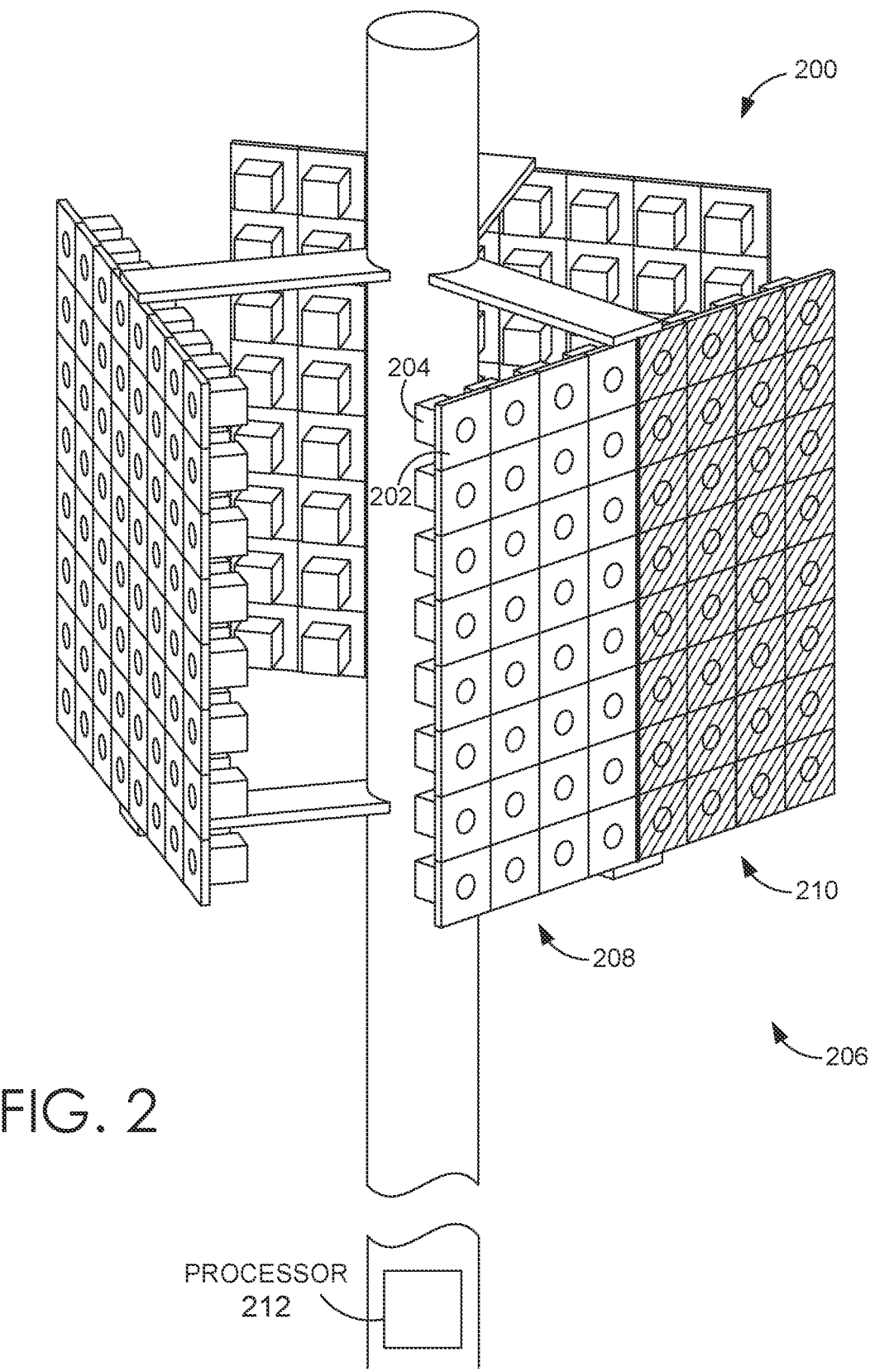
FIG. 2 depicts a schematic representation of a base station suitable for use in aspects of the present disclosure.

FIG. 2 depicts an example base station configuration suitable for use in implementing embodiments of the present disclosure and is designated generally as base station 200. Base station 200 is but one example of a suitable configuration and is not intended to suggest any limitations as to the scope of use or functionality of embodiments described herein. Neither should the configuration be interpreted as having any dependency or requirement relating to any one or combination of components illustrated.

Base station 200 comprises at least a first antenna array 206, the first antenna array 206 having one or more antenna elements 202. In aspects, the one or more antennas 202 may be dipole antennas, having a length, for example, of ¼, ½, 1, 1½, or any desired wavelength. In aspects, the antenna array 206 may be an active antenna array, FD-MIMO, massive MIMO, 3G, 4G, LTE, 5G, NR, and/or 802.11. While we refer to dipole antennas herein, in other aspects, the antenna may be monopole, loop, parabolic, traveling-wave, aperture, yagi-uda, conical spiral, helical, conical, radomes, horn, and/or apertures, or any combination thereof. It is noted that adjusting one or more individual power supplies to antennas of an antenna array may be broadly applicable to an antenna array comprising any type of antenna targeting any portion of the RF spectrum (though any lower than VHF may be size prohibitive). In one aspect, the antenna may be configured to communicate in the UHF and/or SHF spectrum, for example, in the range of 1.3 GHz-30 GHz.

By way of a non-limiting example, the antenna array 206 may comprise 64 antenna elements 202 arranged in an 8×8 structure or grid, having 8 rows of 8 columns of the 64 antenna elements 202. In other aspects, the antenna array 206 may comprise antenna elements arranged in an 8×4, 4×8, or 4×4 configuration. Although, the arrangement of the antenna elements 202 is discussed as a grid structure herein, the arrangement of the antenna elements 202 may have any of a number of structures, multi-planar positions, and vertical and/or horizontal arrangements. Each antenna element 202 of the antenna array 206 may comprise a dedicated power supply 204. The power supply 204 supplies power having a certain phase and amplitude to a respective antenna element 202. In an aspect, the power supply comprises a power amplifier. In various aspects, the power supply, e.g., the power supply 204, may additionally comprise a processor for controlling or adjusting the power supply to the respective antenna element 202. In aspects, each power supply 204 may have a maximum power to supply to its respective antenna element 202. In aspects, the maximum per-antenna supply power may be 2.5 W, 3.5 W, 4 W, 5 W, or any desired value.

In aspects, the antenna array 206 may comprise a partitioning of the antenna array 206 into any number of sub-arrays, that each may be associated with a communication protocol. For example, the antenna array 206 may be partitioned into a first sub-array 208 and a second sub-array 210. In some aspects, the antenna elements of the antenna array 206 may be associated with a communication protocol, such as a LTE or NR 5G protocol. In some aspects, the first sub-array 208 may be associated with, and operate on, a first protocol, while the second sub-array 210 may be associated with, and operate on, a second protocol. For example, the first sub-array 208 may communicate with a user device using an LTE configuration while the second sub-array 210 may communicate with a user device by using a NR 5G configuration. In some embodiments, the first sub-array 208 configured to use LTE may operate in association with the second sub-array 210 configured to use 5G with respect to a particular user device. In such embodiments, the base station 200 can operate on a 5G dual connectivity protocol where LTE connectivity may be supplemented with one or more additional cells or antenna elements from the antenna array 206 that operate on a 5G configuration.

It should be understood that the configuration or pattern of the antenna elements 202 utilizing a partitioning of the first sub-array 208 and second sub-array 210 is just one example configuration. In aspects, this left half and right half configuration depicted in FIG. 2 may be a default configuration for the antenna array 206, where the configuration controller 112 of FIG. 1 is utilized to analyze, switch, and/or modify all or any part of the antenna elements 202 between a first protocol and a second protocol which may involve configuring antenna elements into sub-arrays that may be partitioned on vertical and/or horizontal arrangements. In some aspects, antenna elements 202 may be located on any of a number of antenna arrays, which may be located on any of a number of base stations. For example, the first sub-array 208 may be located at a first base station while the second sub-array 210 may be located at a second base station. For instance, the first sub-array 208 located at the base station 200 may operate on LTE and recruit the second sub-array 210 that operates on 5G and is located at another base station.

In aspects, the base station 200 may further comprise a processor 212. In such aspects, the processor 212 may be any one or more convenient processors, servers, computer processing components, or the like, that can be configured to perform any one or more operations of the configuration controller 112 of FIG. 1. In some aspects, the processor 212 may be communicatively coupled to the first sub-array 208 and the second sub-array 210, and/or to each antenna element 202 of the first sub-array 208 and the second sub-array 210. In aspects, as discussed above with respect to the configuration controller 112 of FIG. 1, the processor 212 of FIG. 2 may execute all or a part of the actions for configuring one or more protocols in one or more base stations and/or user devices based on information associated with one or more user devices.

Figure 3:
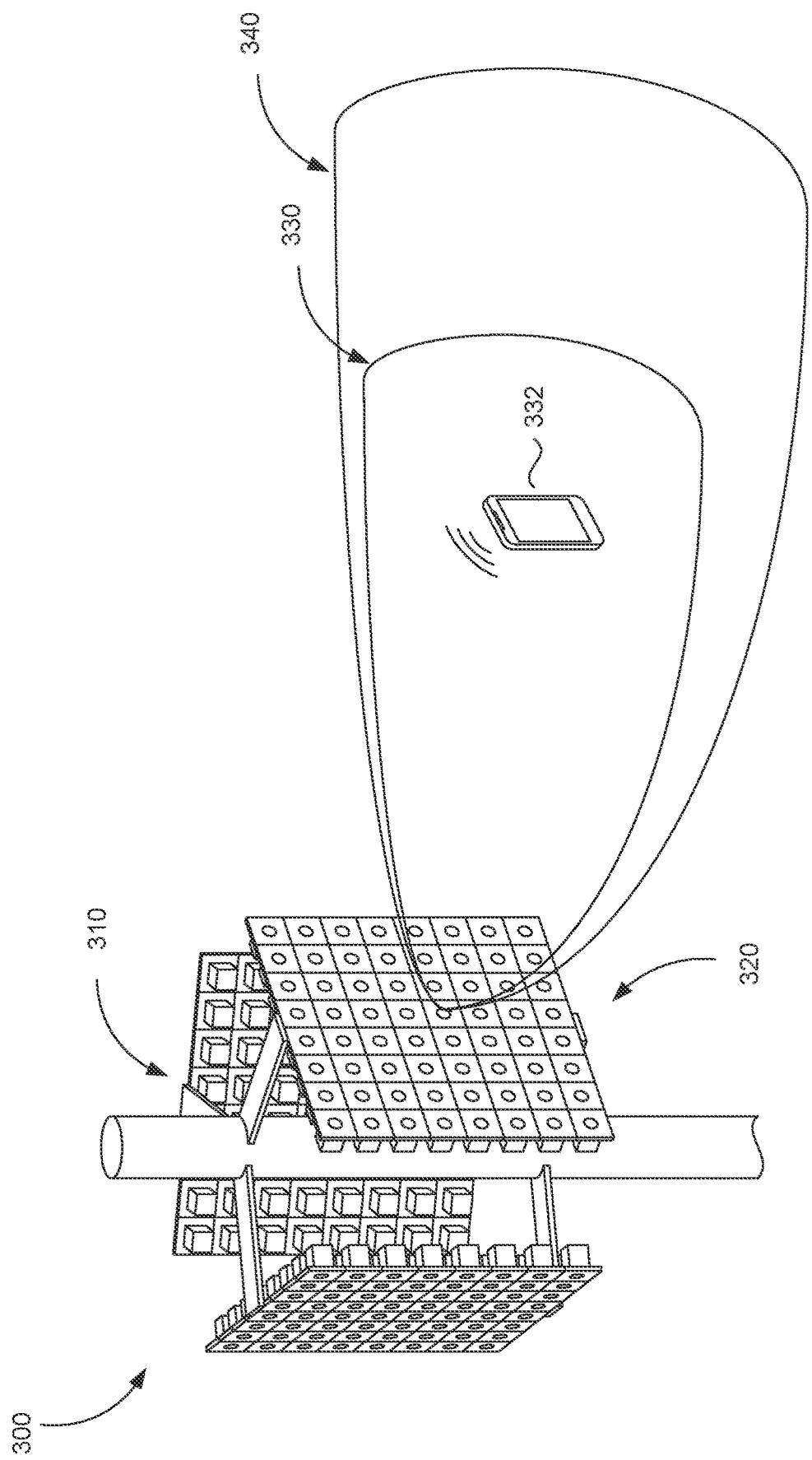
FIG. 3 depicts a system that includes a base station and a user device in a location relative to one or more RF coverage footprints of an wireless base station, in accordance with aspects herein.

FIG. 3 depicts a system 300, e.g., a telecommunications system, which includes a base station 310 for providing wireless communication services to a plurality of user devices. In the aspect depicted in FIG. 3, the base station 310 includes an antenna array 320. In aspects, the base station 310 can include any or all of the properties and parameters of the base station 200 described above with reference to FIG. 2 and/or the network environment 100, including the cell site 114, described above with reference to FIG. 1. For instance, in aspects, the base station 310 can include a first portion of a plurality of antenna elements that may be configured to operate on a first communication protocol and one or more additional portions of the plurality of antenna elements that may be configured to operation on one or more additional communication protocols. In the aspect depicted in FIG. 3, the base station 310 and/or antenna array 320 is communicating with a UE 332.

In aspects, as discussed above, the systems and methods disclosed herein may receive information associated with one or more UEs to identify one or more base stations and/or user devices for modification between a first communication protocol and a second communication protocol of the base station 310. As further discussed above, in aspects, the information associated with one or more UEs may indicate a measurement or other data associated with signal quality for the one or more UEs. In some aspects, the information associated with one or more UEs may indicate a data rate, a data buffer size, data buffer status, and or any of a number of measurements associated with communication data for the one or more UEs.

For instance, in one example scenario, the UE 332 may be initially located at a first position relative to the antenna array 320 at a first time. For example, the first position may be located within a first RF coverage footprint 340. The first RF coverage footprint 340 may be associated with a particular communication protocol, and/or particular communication equipment. For example, the first RF coverage footprint 340 may correspond to a LTE communication protocol. In such aspects, based on the information associated with the UE 332, the one or more antenna elements of the antenna array 320 may be configured to a first communication protocol at the base station 310. In such aspects, the information associated with the UE 332 may be a measurement indicating signal quality, such as RSRP. The base station 310 may store the information associated with the UE in a database such as the database 110 of FIG. 1. In some embodiments, the base station 310 may determine that communication with the UE 322 will operate according to a first protocol. For instance, the base station 310 may receive information from the UE 322 indicating a signal quality within determined threshold values associated with an LTE communication protocol. The base station may store the received information in a database and may then be configured to communicate with the UE 322 using that LTE communication protocol. Further, in such aspects, the UE 332 may be moved to be located at a second position relative to the antenna array 320 at a second time. The second position may be located within a second RF coverage footprint 330. The second RF coverage footprint may be associated with a particular communication protocol, and/or particular communication equipment. For example, the second RF coverage footprint 330 may correspond to a NR 5G communication protocol. In some embodiments, portions of a RF coverage footprint, such as portions of the second RF coverage footprint, may overlap with at least a portion of one or more other RF coverage footprints, such as portions of the first RF coverage footprint 340. In such aspects, based on the information associated with the UE 332 at the second position, comprising signal quality information, the one or more antenna elements of the antenna array 320 and/or UE 332 may be re-configured to a second communication protocol, such as a 5G dual connectivity protocol (e.g., eNDC). The information associated with the UE 322 may indicate an improved signal quality compared to the measurement of signal quality at the first position. For instance, the base station 310 may compare the information associated with the UE 322 at the second position to the information from the first position that may have been stored in a database, to determine if the antenna array 320 should be re-configured to operate on a second protocol. In some embodiments, this determination may be based on a predetermined threshold value associated with signal quality information or may be based on a comparison to other measurements of signal quality. In such aspects, at the first time, the antenna array 320 may be configured to a first protocol, while at a second time, the antenna array 320 may be configured to a second protocol.

In another example scenario, the information associated with UE 332 may indicate a change in a data buffer status. For example, the information associated with UE 332 may indicate that the current data buffer is of a certain size and based on the data buffer size, the antenna array 320 may be configured to establish or attempt to establish a second communication protocol. Determining whether or not to re-configure the base station 310 may be based on data rate, data buffer size, rate of change in data buffer size, service level associated with UE 332, and/or any of a number of conditions associated with data transfer between the base station 310 and the UE 332. For example, the base station 310 may be re-configured based on the data buffer exceeding a defined threshold value. In some embodiments the data buffer may be associated with downlink data transfer and/or may be associated with uplink data transfer.

Figure 4:
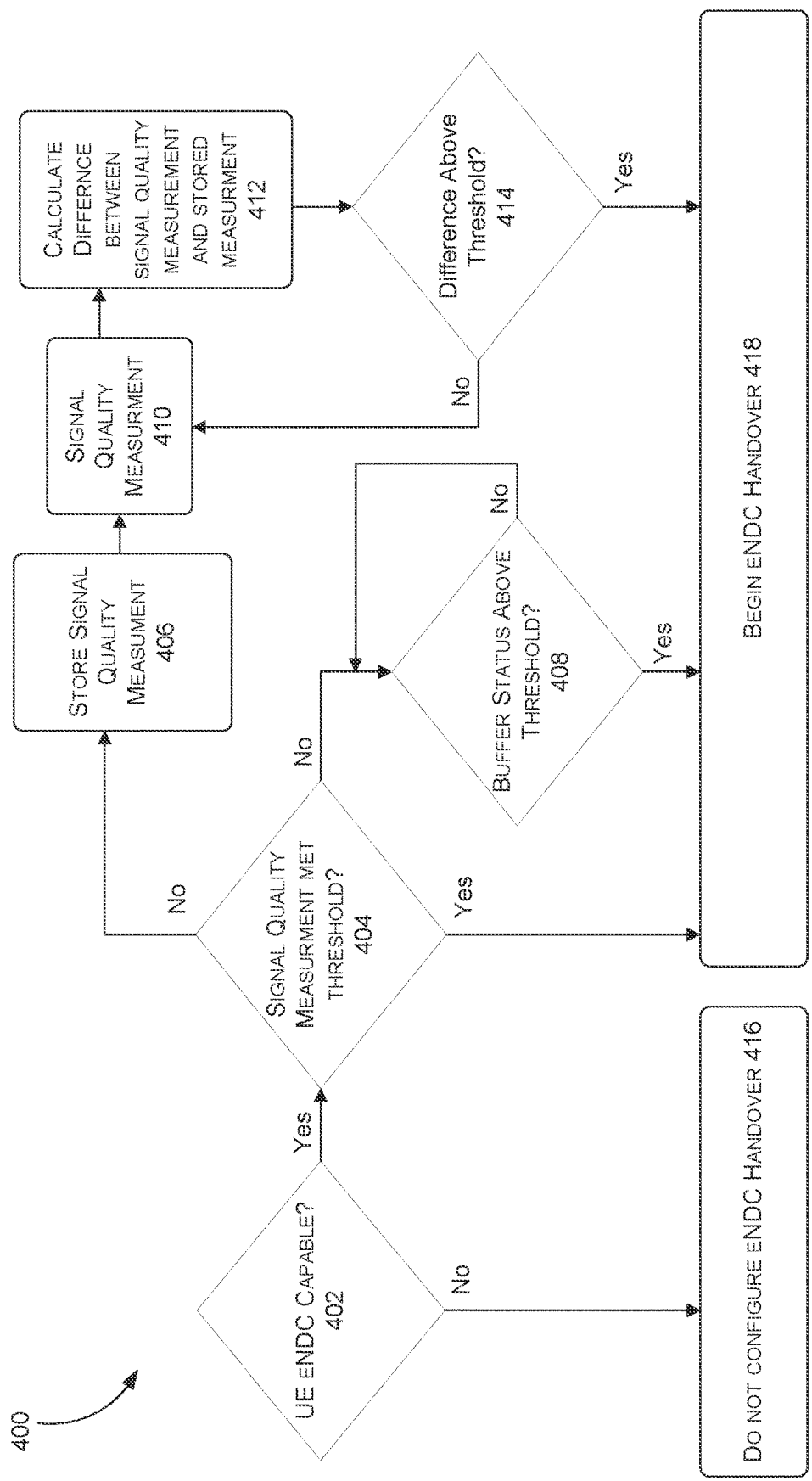
FIG. 4 depicts a flow diagram illustrating an example method for re-configuring a wireless protocol in communication networks, in accordance with aspects of the present disclosure.

FIG. 4 is a flow diagram illustrating an example method 400 for re-configuring a wireless protocol in communication networks. It should be understood that while FIG. 4 depicts just one particular arrangement and/or order of steps, other arrangements and/or orders of steps are possible and contemplated by the disclosed herein. For instance, one or more of the steps depicted in FIG. 4, may be performed in a different order or otherwise omitted.

At step 402 of the method 400, it is determined if a UE device has the capability to operate on a particular protocol, such as eNDC. For example, a UE may provide information that indicates a capability of the UE to operate on a dual connectivity protocol and/or to what level or capacity it may operate on such a protocol. In some example, the UE may provide capability information in response to an inquiry. An inquiry may be transmitted by a base station, such as base station 310 of FIG. 3, to a UE device to determine whether that UE device can operate on a dual connectivity protocol. In some embodiments, it may be determined that a particular UE device is not capable of operating on a particular protocol. In such an embodiment, the base station may cease any further attempts to configure a connection with the UE device using that particular protocol, as is depicted in step 416 of method 400, as the UE device is not suitable. In some embodiments, it may be determined that the UE device is capable of operating on a desired protocol and in response to such a determination, procedures attempting to configure the desired dual connectivity protocol may commence.

At step 404 of the method 400, signal quality information associated with the UE device may be received by the base station. In some examples, it may be determined that the received signal quality information is sufficient to begin procedures to configure the base station and UE device to communicate using a particular communication protocol. For example, the base station may receive measurements, such as B1 measurements corresponding to a dual connectivity and/or NR 5G protocol. In some embodiments, multiple measurements may be received. For example, the base station may receive a signal quality measurement corresponding to a NR 5G protocol and a signal quality measurement corresponding to another protocol, such as an LTE protocol.

At step 406 of the method 400, the base station may determine that the signal quality measurements associated with the eNDC protocol received from the UE device exceed a predetermined threshold and therefore, the procedures for eNDC handover can begin, as in step 418. In some embodiments, it may be determined that the signal quality measurement does not meet the threshold value and in such embodiments, the base station and UE device may continue to operate on the present communication protocol. In some embodiments, the signal quality measurement 404 may be performed periodically to determine if the measured signal quality meets the threshold, as in step 406. For example, the signal quality measurement may be performed according to a defined frequency and/or active period. The active period may indicate a length of time for which the signal quality measurement 404 may be attempted. For example, in step 408, the signal quality measurement 404 may be attempted for a length of time before it "times out" or becomes inactive, as in step 420. As depicted in step 422, the signal quality measurement values may be stored in a database, such as the database 110 of FIG. 1. For example, the measured values corresponding to a 5G NR protocol (e.g., B1) and the measured values corresponding to an LTE protocol (e.g., RSRP) may be stored in one or more databases.

At step 408, of method 400, it is determined whether a measurement timeout has occurred. As described above, signal quality measurements, as in step 404, may be performed and received periodically. If a signal quality measurement has not been received from a UE device within particular measurement timeout duration, further attempts at performing the signal quality measurement 404 may be halted. As an example, if a base station has not received a 5G NR measurement (e.g., B1 measurement) corresponding to a dual connectivity protocol (e.g., eNDC) within a timeout duration of 8 seconds, it may stop attempts to perform that 5G NR measurement, as it may result in unnecessary resource consumption (e.g., power, data rate, etc.). If measurement timeout 408 has occurred, any process to configure eNDC handover may de-configured and place the eNDC procedures in an inactive state, such as in step 420.

In some embodiments, the base station may attempt to re-activate eNDC processes by identifying triggering conditions. For example, the base station may use the trigger analyzer 118 of FIG. 1, to identify trigger conditions based on time, a data buffer as in step 424, or signal quality measurements as in steps 410 and 412.

At step 424 of method 400, it is determined whether the buffer status is above a threshold. For example, the buffer status may indicate the size of the data buffer associated with a UE device and/or a data rate associated with the UE device. In some examples, the threshold may be a predetermined value and may be provided by the communication network operator. In some examples, the threshold may be calculated based on one or more previous buffer statuses, e.g., average value over a period of time, rate of change, etc. A buffer status that exceeds a threshold may indicate an increased demand for data by the UE device. For example, a UE device that is streaming high definition video data may correspond to an increased data buffer size. Similarly, the buffer status may be associated with a service level provided to the UE device. For example, an UE device may be given priority to other devices and as a result, may have an enhanced data throughput and/or data rate. If it is determined that the buffer status exceeds the threshold, the base station may begin eNDC handover procedures by re-activating the inactive 5G signal quality measurements, as depicted in step 404. In some examples, the buffer status may be continuously or periodically monitored for changes to the status.

At step 410 of method 400, signal quality information may be received from the UE device. For example, a 5G NR measurement corresponding to the signal quality measurement in step 404 may be in a de-activated state, but an LTE protocol measurement, such as RSRP, may continue to be actively measured in step 410. In some embodiments, the signal quality information comprises periodic measurements of signal quality from the UE device. In some embodiments, the UE device may transmit signal quality information to the base station in response to receiving a request signal and/or reference signal. In some examples, the signal quality information is the same type of measurement as in step 404, while in some examples, the signal quality information measured in step 410 may correspond to a different protocol than the measurement in step 404. In some examples the signal quality information comprises the same type of measurement as a measurement that is stored in step 406. Signal quality information may comprise measurements such as SINR, RSRP, RSRQ, RSSI, or any measurement indicative of signal quality.

Step 412 of method 400 may comprise calculating the difference between a signal quality measurement from step 410, and the signal quality measurement that was stored in step 422. For example, a signal quality measurement may be compared to a stored value to determine if the signal quality measurement indicates an improvement in signal quality. An improvement in signal quality corresponding to a measurement associated with an LTE protocol, may suggest a similar improvement in the potential signal quality of a measurement associated with a 5G NR protocol (e.g., eNDC) even though the measurement associated with the 5G NR protocol is not being performed and/or is in a de-activated state. For example, a signal quality measurement taken while a UE device in new location, such as the second RF coverage footprint 330 of FIG. 3, when compared to a stored measurement taken while the UE device was in a previous location, such as the first RF coverage footprint 340 of FIG. 3, may indicate an improved signal quality and/or suitability to begin eNDC handover procedures, such as the signal quality measurement depicted in step 404. In some embodiments, eNDC handover may begin once the calculated difference exceeds a determined threshold such as in step 414. In some embodiments, if the difference between the signal quality measurement and the stored value does not exceed the threshold, the base station and UE device may continue to operate on the current protocol. In some embodiments, subsequent signal quality measurements, as in step 410, may be evaluated periodically to determine if operation under a new protocol should be attempted.

Figure 5:
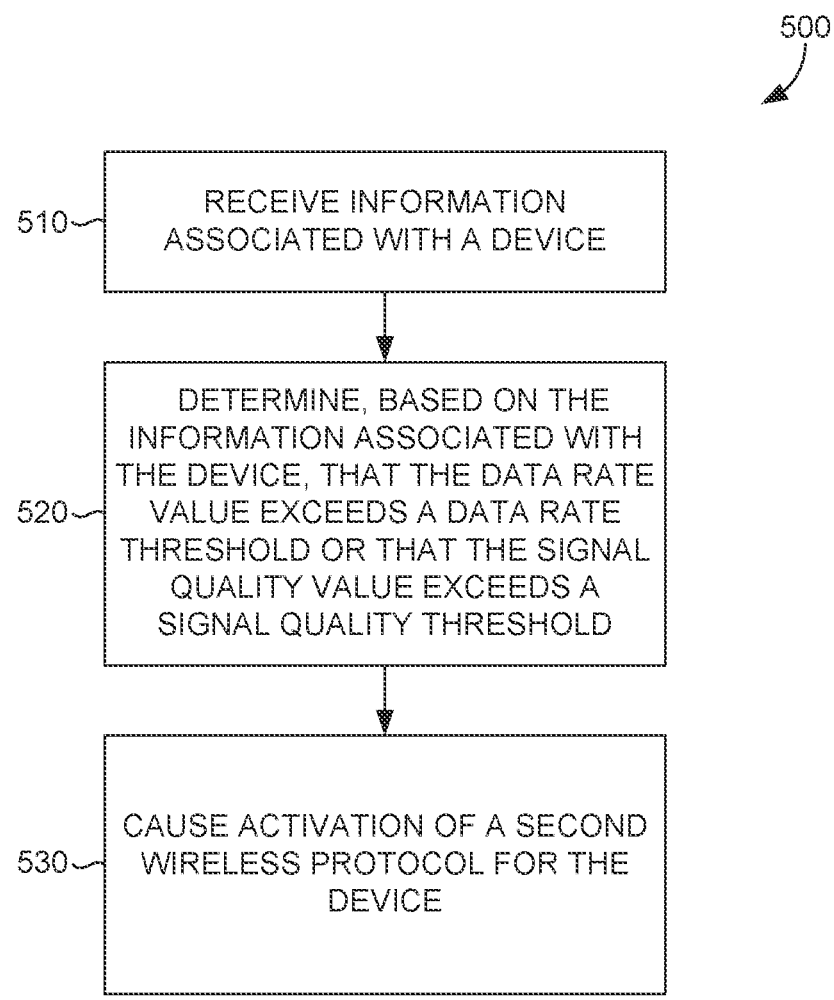
FIG. 5 depicts a flow diagram of an exemplary method for trigger based configurations of wireless protocols in communication networks, in accordance with aspects of the present disclosure.

FIG. 5 is a flow chart of a method 500 for trigger based configurations of wireless protocols in communication networks. In step 510 of the method 500, information associated with a device, e.g. a UE, is received. In aspects, the information can be received by the receiver 116 of the configuration controller 112 of the system 100 discussed above with references to FIG. 1. In various aspects, the information associated with the device can indicate signal quality information for the device. In the same or alternative aspects, the information associated with the device can include, the communication capabilities of the device, a service level of the device, device characteristics, location data, a signal quality measurement value, data buffer status, a data rate value, or a combination thereof.

Step 520 of the method 500, includes determining, based on the information associated with the device, that the data rate value exceeds a data rate threshold or that the signal quality value exceeds a signal quality threshold. In aspects, determining that the data rate value exceeds a data rate threshold may comprise evaluating the size of a data buffer. In the same or alternative aspects, determining that the data rate value exceeds a data rate threshold may comprise evaluating the rate of change of a size of a data buffer. In some aspects, determining that the signal quality value exceeds a signal quality threshold may comprise calculating the difference between the signal quality value and a previously measured signal quality value. The previously measured signal quality value may be retrieved from a data store or database, such as the database 110 depicted in FIG. 1. In some embodiments, the calculated difference between the signal quality value and the previously measured signal quality value may be compared to the signal quality threshold. In one aspect, the step 520 can be performed via the trigger analyzer 118 of the configuration controller 112 of the system 100 discussed above with reference to FIG. 1. In certain aspects, the step 520 can result in identifying one or more trigger conditions indicating the suitability to begin handover procedures for re-configuration from a first wireless protocol to a second wireless protocol in order to enhance the communication performance capabilities of the device based on its signal quality information.

Step 530 of the method 500 includes causing activation of a second wireless protocol for the device. In aspects, the step 530 is performed after determining that the data rate value exceeds a data rate threshold or that the signal quality value exceeds a signal quality threshold in the step 520. In certain aspects, the protocol controller 120 of the configuration controller 112 of the system 100 described above with reference to FIG. 1 can be utilized to perform the step 530.

In certain aspects, as discussed above, causing activation of a second wireless protocol for the device can include transmitting a message to the device indicating and/or instructing the activation of the second protocol. In various aspects as also discussed above, causing activation of a second wireless protocol for the device can include configuring one or more wireless base stations, such as base station 310 depicted in FIG. 3, to operate according to the second wireless protocol. In some aspects, operating according to the second wireless protocol may comprises multiple base stations configured in association with the second wireless protocol. For example, the second wireless protocol may be a dual connectivity protocol and operating according to the second wireless protocol may comprise transmissions between an eNodeB base station (i.e., LTE), a gNodeB base station (i.e., NR 5G), and the device. In various aspects, causing activation of a second wireless protocol may involve configuring the antenna elements as depicted in FIG. 2.

Figure 6:
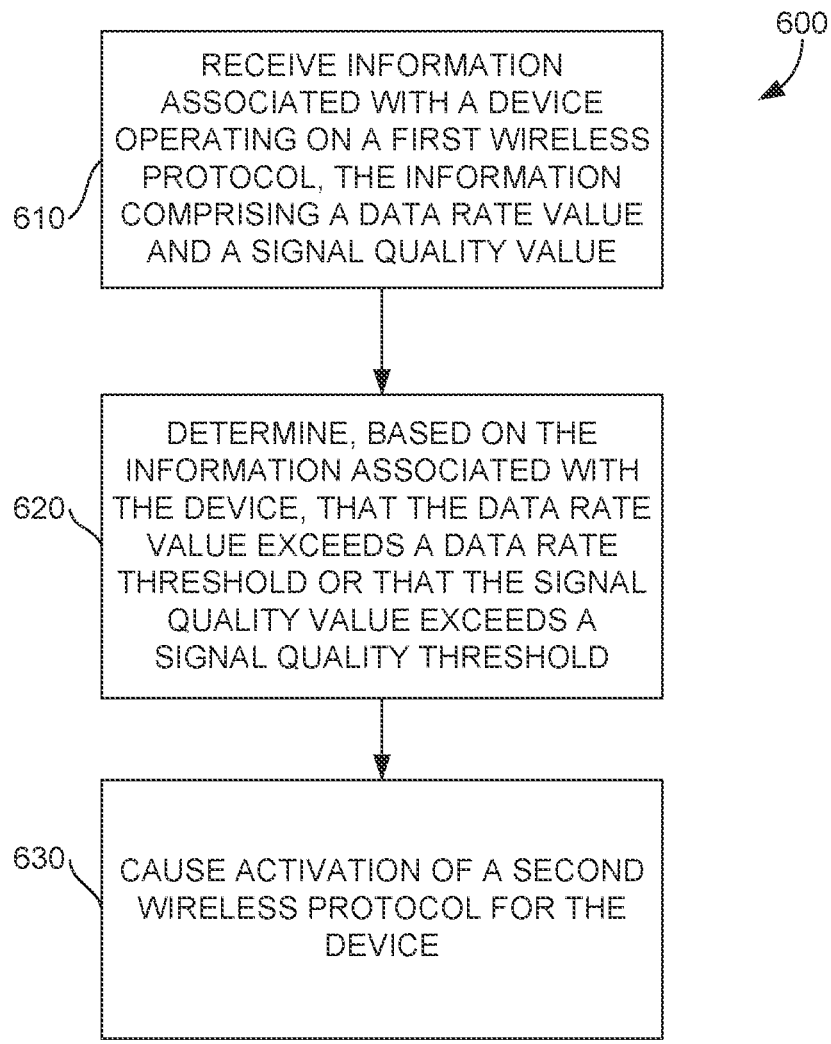
FIG. 6 depicts a flow diagram of another exemplary method for trigger based configurations of wireless protocols in communication networks, in accordance with aspects of the present disclosure.

FIG. 6 is a flow chart of a method 600 for trigger based configurations of wireless protocols in communication networks. In step 610 of the method 600, information associated with a device, e.g., UEs, is received. In aspects, the information can be received by the receiver 116 of the configuration controller 112 of the system 100 discussed above with reference to FIG. 1. In various aspects, the information associated with the device can indicate signal quality information for the device. In the same or alternative aspects, the information associated with the device can include, the communication capabilities of the device, a service level of the device, device characteristics, location data, a signal quality measurement value, data buffer status, a data rate value, or a combination thereof. In some embodiments, the device may transmit the information associated with the device in response to the device receiving a reference signal that may be transmitted by a base station. In some aspects, a base station operating on the first wireless protocol may transmit a request for the information associated with the device as a message to the device.

Step 620 of the method 600, includes determining, based on the information associated with the device, that the data rate value exceeds a data rate threshold or the signal quality value exceeds a signal quality threshold. In aspects, determining, based on the information associated with the device, that the data rate value exceeds a data rate threshold or the signal quality value exceeds a signal quality threshold in the step 620 can be based on the information associated with the device that was received in the step 610 of the method 600. In one aspect, the step 620 can be performed via the trigger analyzer 118 of the configuration controller 112 of the system 100 discussed above with reference to FIG. 1. In certain aspects, the step 620 can result in identifying one or more trigger conditions indicating the suitability to begin handover procedures for re-configuration from a first wireless protocol to a second wireless protocol in order to enhance the communication performance capabilities of the device based on its signal quality information.

Step 630 of the method 600 includes causing activation of a second wireless protocol for the device. In aspects, the step 630 is performed after determining that the data rate value exceeds a data rate threshold or that the signal quality value exceeds a signal quality threshold in the step 620. In certain aspects, the protocol controller 120 of the configuration controller 112 of the system 100 described above with reference to FIG. 1 can be utilized to perform the step 630. In certain aspects, as discussed above, causing activation of a second wireless protocol for the device can include transmitting a message to the device indicating and/or instructing the activation of the second protocol. In various aspects as also discussed above, causing activation of a second wireless protocol for the device can include configuring one or more wireless base stations, such as base station 310 depicted in FIG. 3, to operate according to the second wireless protocol. In some aspects, operating according to the second wireless protocol may comprises multiple base stations configured in association with the second wireless protocol. For example, the second wireless protocol may be a dual connectivity protocol and operating according to the second wireless protocol may comprise transmissions between an eNodeB base station (i.e., LTE), a gNodeB base station (i.e., NR 5G), and the device.

Figure 7:
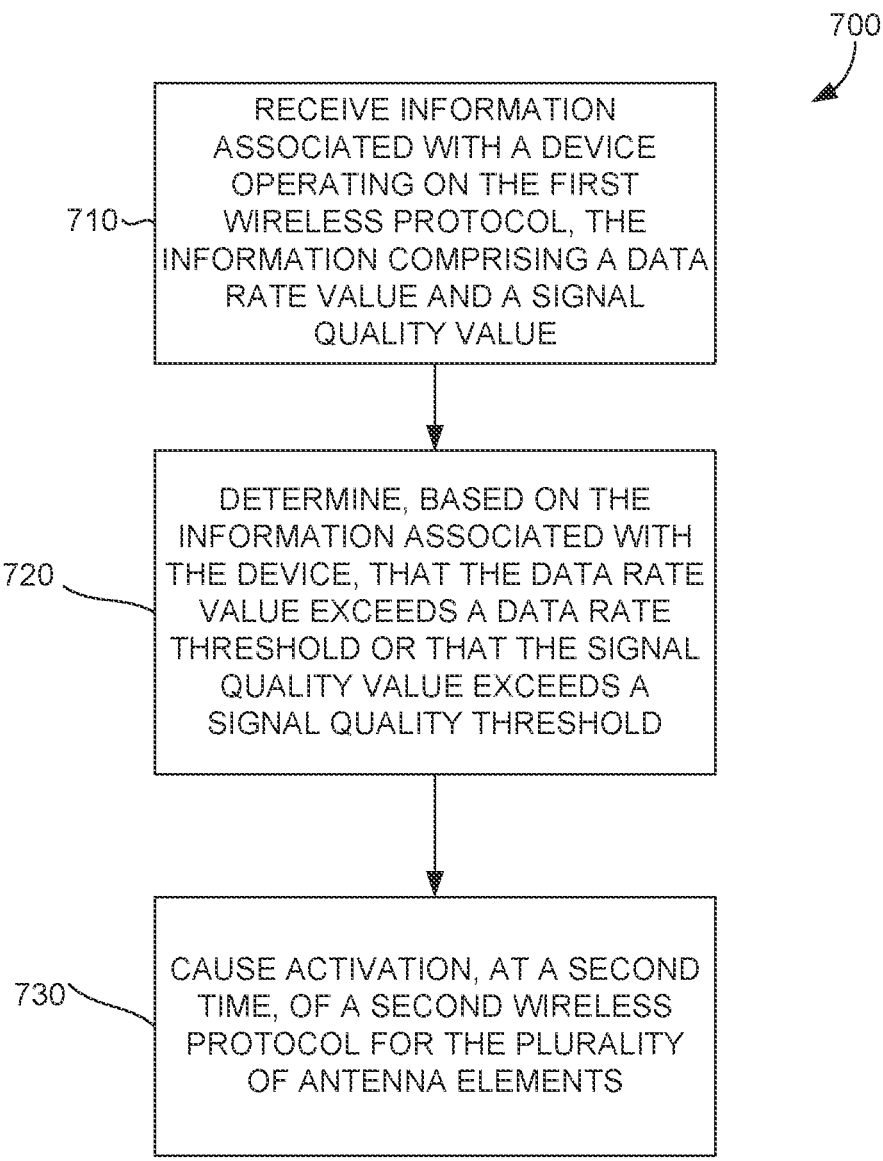
FIG. 7 depicts a flow diagram of another exemplary method for trigger based configurations of wireless protocols in communication networks, in accordance with aspects of the present disclosure.

FIG. 7 is a flow chart of a method 700 for trigger based configurations of wireless protocols in communication networks. In some embodiments, the method 700 may performed by a system comprising an antenna array comprising a plurality of antenna elements, wherein, at a first time, the plurality of antenna elements configured according to a first wireless protocol. The system may also comprise a processor configured to execute operations comprising the method 700.

In step 710 of the method 700, information associated with a device, e.g., UEs, is received. In aspects, the information can be received by the receiver 116 of the configuration controller 112 of the system 100 discussed above with reference to FIG. 1. In various aspects, the information associated with the one or more devices can include signal quality information for each of the one or more devices. In the same or alternative aspects, the communication capabilities of the device, a service level of the device, device characteristics, location data, a signal quality measurement value, data buffer status, a data rate value, or a combination thereof. In some embodiments, the device may be operating on a first wireless protocol concurrently with an antenna array that may also be operating on the first wireless protocol.

Step 720 of the method 700, includes determining, based on the information associated with the device, that the data rate value exceeds a data rate threshold or the signal quality value exceeds a signal quality threshold. In aspects, determining, based on the information associated with the device, that the data rate value exceeds a data rate threshold or the signal quality value exceeds a signal quality threshold in the step 720 can be based on the information associated with the device that was received in the step 710 of the method 700. In one aspect, the step 720 can be performed via the trigger analyzer 118 of the configuration controller 112 of the system 100 discussed above with reference to FIG. 1.

Step 730 of the method 700 includes causing activation, at a second time, of a second wireless protocol for the plurality of antenna elements. In aspects, the step 730 is performed after determining that the data rate value exceeds a data rate threshold or that the signal quality value exceeds a signal quality threshold in the step 720. In certain aspects, the protocol controller 120 of the configuration controller 112 of the system 100 described above with reference to FIG. 1 can be utilized to perform the step 730. In certain aspects, as discussed above, causing activation of a second wireless protocol for the plurality of antenna elements can include transmitting a message to the device indicating and/or instructing the activation of the second protocol for the device. In various aspects as also discussed above, causing activation of a second wireless protocol for the plurality of antenna elements can include configuring one or more wireless base stations, such as base station 310 depicted in FIG. 3, to operate according to the second wireless protocol.

Referring now to FIG. 8, a diagram is depicted of an exemplary computing environment suitable for use in implementations of the present disclosure. In particular, the exemplary computer environment is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, computing device 800 includes bus 802 that directly or indirectly couples the following devices: memory 804, one or more processors 806, one or more presentation components 808, input/output (I/O) ports 810, I/O components 812, power supply 814 and radio(s) 816. Bus 802 represents what may be one or more busses (such as an address bus, data bus, or combination thereof). Although the devices of FIG. 8 are shown with lines for the sake of clarity, in reality, delineating various components is not so clear, and metaphorically, the lines would more accurately be grey and fuzzy. For example, one may consider a presentation component, such as a display device to be one of I/O components 812. Also, processors, such as one or more processors 806, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "computer" or "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, DVD or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF, infrared, and other wireless media. Combinations of any of the above should also be included within the scope of computer-readable media.

Memory 804 includes computer-storage media in the form of volatile and/or nonvolatile memory. Memory 804 may be removable, non-removable, or a combination thereof. Exemplary memory includes solid-state memory, hard drives, optical-disc drives, etc. Computing device 800 includes one or more processors 806 that read data from various entities, such as bus 802, memory 804, or I/O components 812. One or more presentation components 808 presents data indications to a person or other device. Exemplary one or more presentation components 808 include a display device, speaker, printing component, vibrating component, etc. I/O ports 810 allow computing device 800 to be logically coupled to other devices, including I/O components 812, some of which may be built in computing device 800. Illustrative I/O components 812 include a microphone, joystick, game pad, satellite dish, scanner, printer, wireless device, etc.

Radio 816 represents a radio that facilitates communication with a wireless telecommunications network. Illustrative wireless telecommunications technologies include CDMA, GPRS, TDMA, GSM, and the like. Radio 816 might additionally or alternatively facilitate other types of wireless communications including Wi-Fi, WiMAX, LTE, or other VoIP communications. As can be appreciated, in various embodiments, radio 816 can be configured to support multiple technologies and/or multiple radios can be utilized to support multiple technologies. A wireless telecommunications network might include an array of devices, which are not shown so as to not obscure more relevant aspects of the invention. Components, such as a base station, a communications tower, or even access points (as well as other components), can provide wireless connectivity in some embodiments.

Many different arrangements of the various components depicted, as well as components not shown, are possible without departing from the scope of the claims below. Embodiments of this technology have been described with the intent to be illustrative rather than be restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A method for dynamically assigning a wireless protocol to a device, the method comprising:
monitoring information associated with the device configured to operate using a first wireless protocol, the information comprising a data rate value and a signal quality value for the device;
determining, based on the information associated with the device, that the data rate value exceeds a data rate threshold or that the signal quality value exceeds a signal quality threshold;
based on determining that the data rate value exceeds a data rate threshold or that the signal quality value exceeds a signal quality threshold, performing a measurement report for a dual connectivity signal; and
establishing a dual connectivity session between the device and the base station, wherein the dual connectivity session is established with the device based on determining that the measurement report for the dual connectivity signal associated with the base station exceeds a predetermined threshold.

2. The method of claim 1, further comprising transmitting, to the device, a message comprising information associated with the dual connectivity signal.

3. The method of claim 1, wherein receiving the information associated with the device is in response to the device receiving a reference signal.

4. The method of claim 1, further comprising causing activation, based on determining that the data rate value exceeds the data rate threshold or that the signal quality value exceeds the signal quality threshold, of a second wireless protocol for a wireless base station.

5. The method of claim 1, wherein receiving information associated with the device operating on the first wireless protocol is performed in accordance with an information request frequency.

6. The method of claim 1, wherein the signal quality value comprises at least one of SINR, RSRP, or RSRQ measurements.

7. The method of claim 1, wherein the data rate value comprises a data throughput value, data buffer size, a data buffer status, or a combination thereof.

8. The method of claim 1, wherein the dual connectivity session enables transmission between a gNodeB base station, an eNodeB base station, and the device.

9. The method of claim 1, wherein determining that the signal quality value exceeds the signal quality threshold comprises:
comparing the signal quality value to a previous signal quality value retrieved from a database to determine a signal quality improvement value;
comparing the signal quality improvement value to the signal quality threshold; and
storing the signal quality value to the database.

10. One or more non-transitory computer-readable media having computer-executable instructions embodied thereon that, when executed, perform a method for dynamically assigning a wireless protocol to a device, the method comprising:
monitoring information associated with the device configured to operate using a first wireless protocol, the information comprising a data rate value and a signal quality value for the device;
determining, based on the information associated with the device, that the data rate value exceeds a data rate threshold or that the signal quality value exceeds a signal quality threshold;
based on determining that the data rate value exceeds a data rate threshold or that the signal quality value exceeds a signal quality threshold, performing a measurement report for a dual connectivity signal; and
establishing a dual connectivity session between the device and the base station, wherein the dual connectivity session is established with the device based on determining that the measurement report for the dual connectivity signal associated with the base station exceeds a predetermined threshold.

11. The non-transitory media of claim 10, further comprising causing activation, based on determining that the data rate value exceeds the data rate threshold or that the signal quality value exceeds the signal quality threshold, of a second wireless protocol for a wireless base station.

12. The non-transitory media of claim 11, further comprising transmitting a message to the device based on determining that the data rate value exceeds the data rate threshold or that the signal quality value exceeds the signal quality threshold, the message comprising information associated with the second wireless protocol.

13. The non-transitory media of claim 10, wherein receiving the information associated with the device is in response to the device receiving a reference signal transmitted by a base station operating on the first wireless protocol.

14. The non-transitory media of claim 10, wherein determining that the signal quality value exceeds the signal quality threshold comprises:
comparing the signal quality value to a previously measured signal quality value to determine a signal quality improvement value; and
comparing the signal quality improvement value to the signal quality threshold.

15. A system for dynamic assignment of a wireless protocol to a device, the system comprising:
an antenna array comprising a plurality of antenna elements, wherein, at a first time, the plurality of antenna elements configured according to a first wireless protocol; and
a processor configured to execute operations comprising:
monitoring information associated with the device configured to operate using a first wireless protocol, the information comprising a data rate value and a signal quality value for the device;
determining, based on the information associated with the device, that the data rate value exceeds a data rate threshold or that the signal quality value exceeds a signal quality threshold;
based on determining that the data rate value exceeds a data rate threshold or that the signal quality value exceeds a signal quality threshold, performing a measurement report for a dual connectivity signal; and
establishing a dual connectivity session between the device and the base station, wherein the dual connectivity session is established with the device based on determining that the measurement report for the dual connectivity signal associated with the base station exceeds a predetermined threshold.

16. The system of claim 15, wherein receiving the information associated with the device is in response to the device receiving a reference signal.

17. The system of claim 15, wherein the dual connectivity session enables transmission between a gNodeB base station, an eNodeB base station, and the device.

18. The operations of claim 15, further comprising causing activation, at the second time, based on determining that the data rate value exceeds the data rate threshold or that the signal quality value exceeds the signal quality threshold, of a second wireless protocol for the device.

19. The operations of claim 18, further comprising transmitting, to the device, a message comprising information associated with the second wireless protocol.

20. The system of claim 15, wherein the data rate value comprises a data throughput value, data buffer size, a data buffer status, or a combination thereof.

* * * * *